United States Patent [19]
Eom

[11] Patent Number: 6,034,980
[45] Date of Patent: Mar. 7, 2000

[54] LASER SCANNING UNIT MODULE

[75] Inventor: Yoon-seop Eom, Suwon, Rep. of Korea

[73] Assignee: Samsung Electronics Co., Ltd., Kyungki-do, Rep. of Korea

[21] Appl. No.: 09/126,603

[22] Filed: Jul. 31, 1998

[30]  Foreign Application Priority Data

Nov. 25, 1997 [KR]  Rep. of Korea ..................... 97-62689

[51] Int. Cl.[7] .............................. H01S 3/18; G01D 9/42; H04N 1/21
[52] U.S. Cl. ................................ 372/43; 372/50; 372/38; 346/107.1; 346/107.3; 346/107.4; 346/107.5; 358/296
[58] Field of Search ................................. 372/43, 50, 38; 346/108, 1.1, 160, 107.1, 107.3, 107.4, 107.5, 107.6; 358/296

[56]  References Cited

U.S. PATENT DOCUMENTS

| | | | |
|---|---|---|---|
| 5,019,913 | 5/1991 | Kiya et al. | 358/296 |
| 5,107,278 | 4/1992 | Shimada et al. | 346/108 |
| 5,260,570 | 11/1993 | Nakamura et al. | 250/235 |
| 5,381,167 | 1/1995 | Fujii et al. | 346/157 |
| 5,754,215 | 5/1998 | Kataoka et al. | 347/235 |
| 5,838,001 | 11/1998 | Minakuchi et al. | 250/236 |
| 5,883,731 | 3/1999 | Kasai | 359/204 |

FOREIGN PATENT DOCUMENTS

| | | | |
|---|---|---|---|
| 59-29220 | 2/1984 | Japan | G02B 27/17 |

OTHER PUBLICATIONS

Patent Abstracts of Japan vol. 011, No. 052 (P–548) Feb. 18, 1987 & JP 61 219915 A (Ricoh Co. Ltd) Sep. 30, 1986 *Abstract.

Patent Abstracts of Japan vol. 015, No. 515 (P–1293) Dec. 27, 1991 & JP 03 223876 A (Canon Inc) Oct. 29, 1996 *Abstract.

Patent Abstracts of Japan vol. 097, No. 002, Feb. 28, 1997 & JP 08 282008 A (Canon Inc) Oct. 29, 1996 *Abstract.

Patent Abstracts of Japan vol. 096 No. 012, Dec. 26, 1996 & JP 08 211317 A (Canon Inc) Aug. 20, 1996 *Abstract.

Patent Abstracts of Japan vol. 017, No. 416 (P–1584), Aug. 3, 1993 & JP 05 080262 A (Canon Inc) Apr. 2,1993 *Abstract.

Patent Abstracts of Japan vol. 017, No. 323 (P–1559), Jun. 18, 1993 & JP 05035061 A (Brother Ind Ltd) Feb. 12, 1993 *Abstract.

*Primary Examiner*—Brian Healey
*Attorney, Agent, or Firm*—Sughrue, Mion, Zinn, Macpeak & Seas, PLLC

[57]  ABSTRACT

A laser scanning unit module (30) including one or more laser scanning units (LSUs), a base plate on which the laser scanning units are installed, and a memory device (80) for storing data required for scanning control of each LSU. Information for controlling the scanning synchronization of each LSU is provided from the memory device such that misregistration of images is prevented after the LSU module is installed in the printer. A test printing process for controlling the scanning synchronization is not required. Also, when replacing the LSU module of a printer, a new LSU module can be easily selected by reading information of the scanning characteristics provided from the memory device.

8 Claims, 3 Drawing Sheets

LASER SCANNING UNIT MODULE

BACKGROUND OF THE INVENTION

1. Field of the Invention

The present invention relates to a laser scanning unit module applied to a printer, and more particularly, to a laser scanning unit module having a memory for storing information required for laser scanning control of the laser scanning unit.

2. Description of the Related Art

Referring to FIG. 1, a conventional color printer comprises a photosensitive belt 14 circulating around three rollers 11, 12 and 13 arranged at three corners, and a reset device 15, laser scanning units 16, developing units 17, a drying device 18 and a transferring device 20 which are arranged adjacent to the circulating path of the photosensitive belt 14.

In a printing operation, each laser scanning unit 16 irradiates light corresponding to an image to be printed on a predetermined region of the photosensitive belt 14 passing by the reset device 15 while the photosensitive belt 14 circulates. During this process, an electrostatic latent image is formed in the photosensitive belt 14. The developing units 17 provide a solid developing material, toner, or a developing solution to the region of the photosensitive belt 14 in which the electrostatic latent image has been formed, thereby developing the electrostatic latent image into a toner image. As the photosensitive belt 14 continues to circulate, the toner image is transferred onto a transferring roller 21 from the photosensitive belt 14. The image transferred onto the transferring roller 21 is transferred again onto a paper 23 which is fed between the transferring roller 21 and a press roller 22, so that an intended image is printed onto the paper 23.

In the operation of the above printing process, in order to obtain a distinct color image without misregistration, it is necessary to synchronize the start of scanning of the laser scanning units 16 such that the laser scanning units 16 arranged a predetermined distance apart can irradiate light onto a predetermined region of the belt, respectively.

According to the prior art, the scanning synchronization of each laser scanning unit 16 is controlled by the following method.

First, after a printer is completely assembled, an image having a predetermined test pattern is printed as a test. Then, a tester physically measures the distance between each color pattern, from the obtained print. Based on the distance between each color pattern, the scanning start timing of each laser scanning unit 16 and the emission interval between light beams per pixel are adjusted, and the adjusted data are input to a lookup table (not shown) used to control the scanning synchronization.

However, the conventional control method for the scanning synchronization requires repeated test printings to achieve precise controlling by minimizing errors manipulated by the test printing. Thus, it takes a long time to obtain the data for precise scanning synchronization. Also, because the scanning characteristics of the laser scanning units 16 are evaluated from the printed result, the above process must be performed again after assembly or replacement of the laser scanning units.

SUMMARY OF THE INVENTION

To solve the above problems, it is an objective of the present invention to provide a laser scanning unit module for a printer which does not require a test printing, by providing data required for controlling scanning synchronization as to laser scanning units.

Accordingly, to achieve the above objective, there is provided a laser scanning unit module comprising: one or more laser scanning units each having a rotary polygon mirror having a plurality of reflection surfaces, a light source for irradiating light toward the rotary polygon mirror, and a lens unit for focusing light reflected from the reflection surfaces of the rotary polygon mirror on an image forming surface; a base plate on which the laser scanning units are installed; and a memory device for storing data required for scanning control of each laser scanning unit.

BRIEF DESCRIPTION OF THE DRAWINGS

The above objective and advantage s of the present invention will become more apparent by describing in detail a preferred embodiment thereof with reference to the attached drawings in which.

DESCRIPTION OF THE PREFERRED EMBODIMENTS

Figure 1:
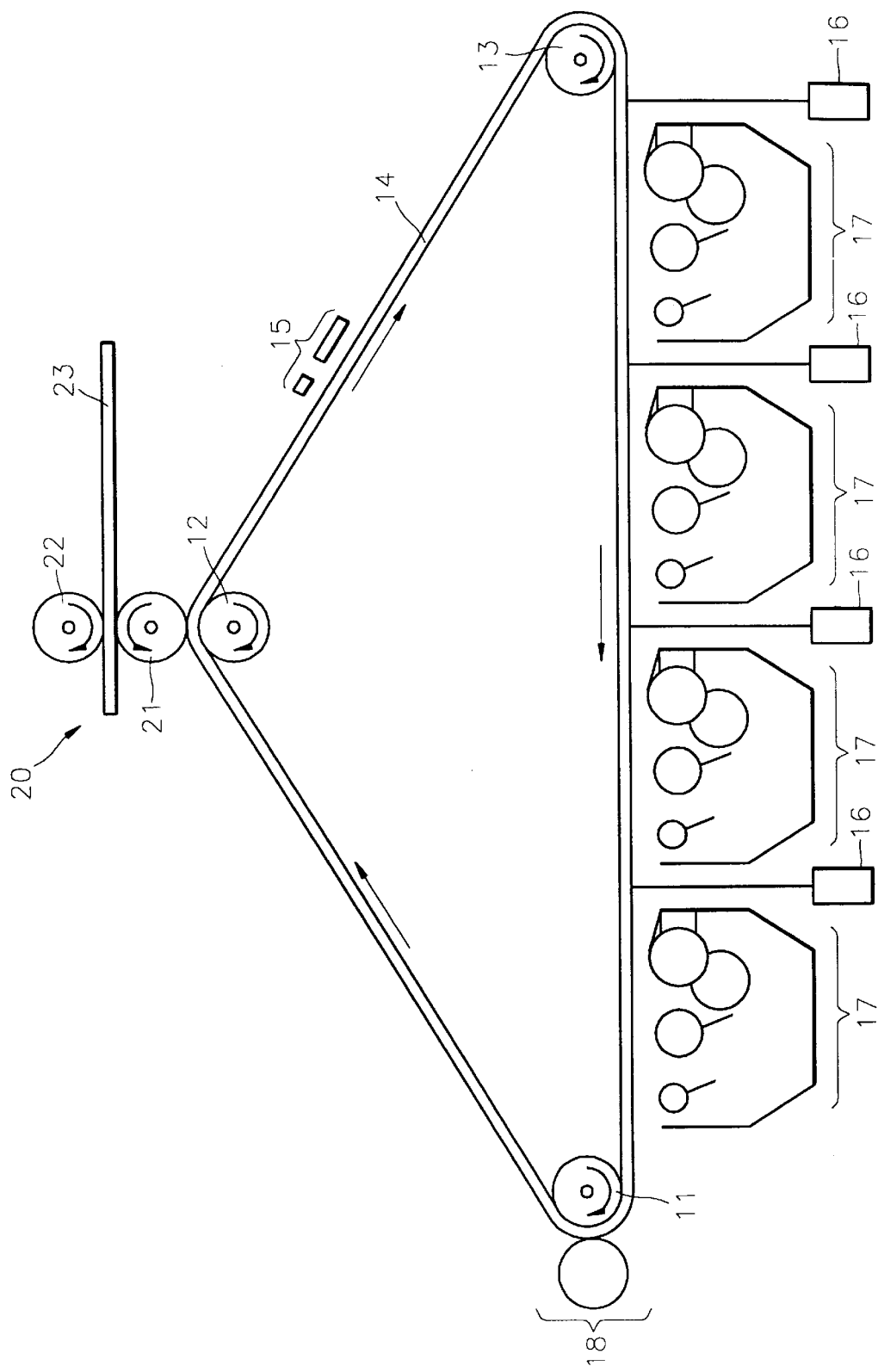
FIG. 1 is a vertical sectional view of a conventional color printer.
Figure 2:
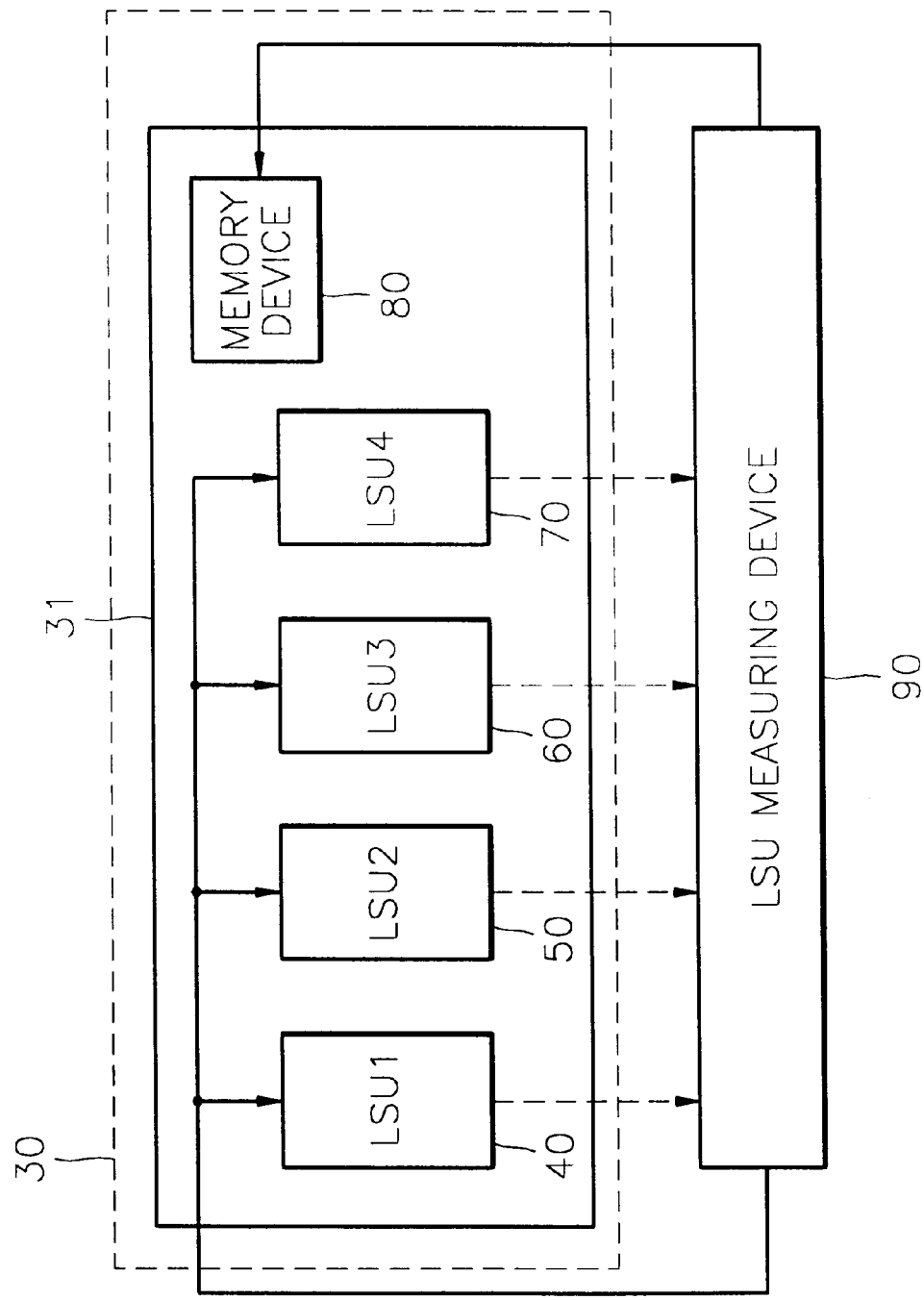
FIG. 2 is a block diagram showing a laser scanning unit module and a device for measuring the optical scanning characteristics of the module according to the present invention.

Referring to FIG. 2 which shows a laser scanning unit (LSU) module and a device for measuring the laser scanning characteristics thereof, a laser scanning unit module 30 includes a memory device 80, four LSUs 40, 50, 60 and 70, and a base plate 31 in which the four LSUs are installed. The memory device 80 is a non-volatile memory device such as an electrically erasable and programmable read only memory (EEPROM) or flash memory.

An LSU measuring device 90 acquires distribution information of light incident onto the surface of a target to be evaluated while driving the LSU module 30, to calculate various data relating to the optical scanning characteristics, and records the data among the calculated data, required for controlling scanning synchronization during printing, in the memory device 80.

The method of calculating the scanning characteristic data and the data recording process by the LSU measuring device 90 will be described in detail with reference to FIG. 3.

Figure 3:
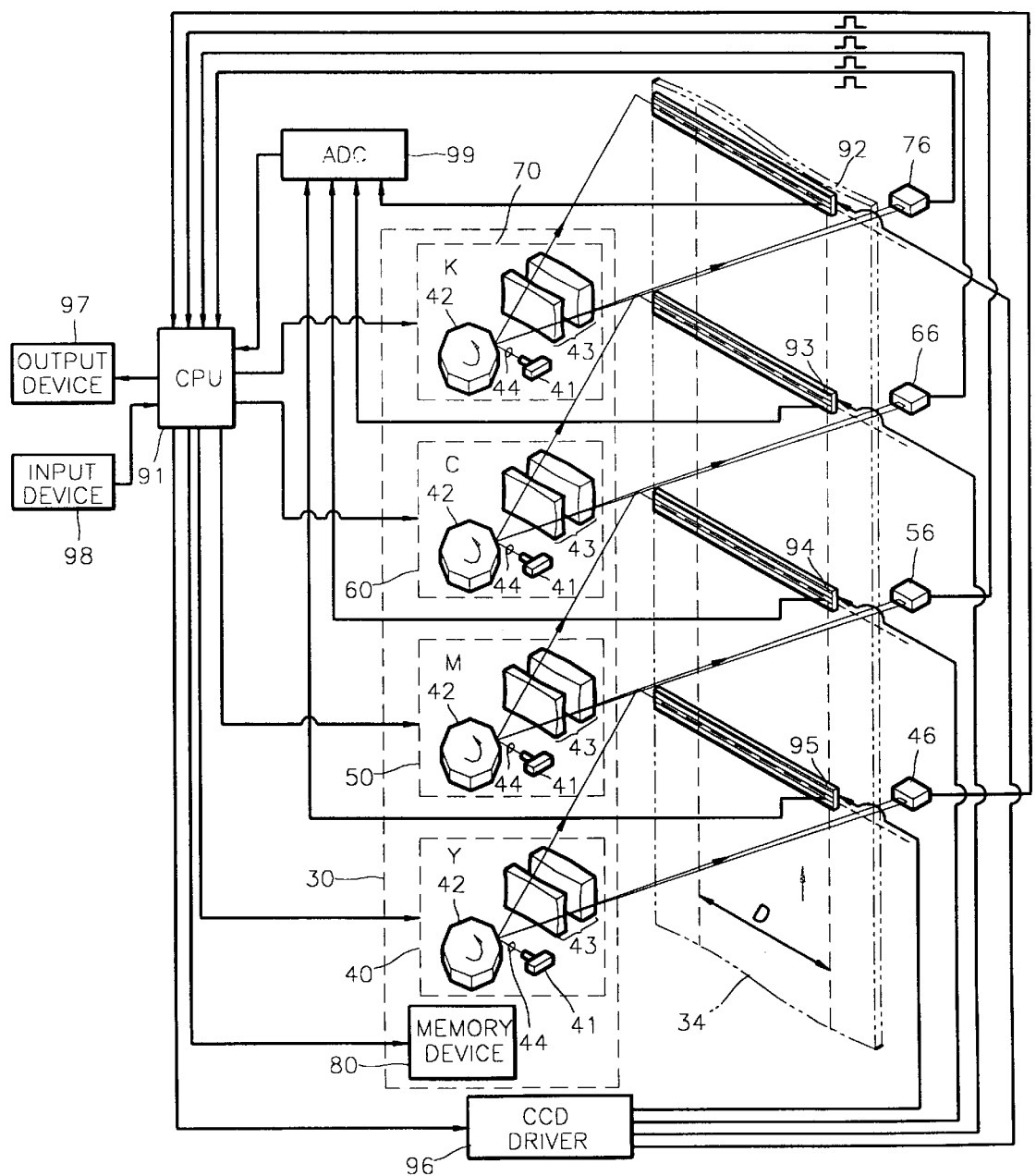
FIG. 3 is a diagram showing examples of the laser scanning unit module and the measuring device of FIG. 2, for illustrating a method of obtaining the scanning characteristic data, and a process of recording data in a memory.

Referring to FIG. 3, the measuring device 90 for measuring the scanning characteristics of the LSU module 30 in which the four LSUs 40, 50, 60 and 70 are installed includes charge coupled devices (CCDs) 92, 93, 94 and 95, a CCD driver 96, an analog-to-digital converter (ADC) 99, a central processing unit (CPU) 91, an input device 98 and an output device 97. The output device 97 includes a monitor as a display device, and a printer as a printing device.

The distance between the LSU module 30 and the CCDs 92, 93, 94 and 95 is maintained to be the same as the distance between the LSU module 30 and a photosensitive medium such as a photosensitive belt 34, after being installed in a printer.

The CCDs 92, 93, 94 and 95 are arrays of a unit device partitioned into fine pixel units, for generating information on the position of the detected light, and the size of a light spot.

Photodetectors 46, 56, 66 and 76 placed next to the CCDs 92, 93, 94 and 95 are for controlling synchronization of the scanning timing of the LSUs 40, 50, 60 and 70.

The LSUs 40, 50, 60 and 70 scan color information, e.g., yellow (Y), magenta (M), cyan (C) and black (B), respectively, and each have a light source 41, a rotary polygon mirror 42 and a lens unit 43. A collimating lens 44 placed between the light source 41 and the rotary polygon mirror 42 collimates the light beam emitted from the light source 41 to be incident onto a reflection surface of the rotary polygon mirror 42. The rotary polygon mirror 42 rotates at a constant speed by a driving means, such as a motor (not shown).

In measuring the scanning characteristics, light is emitted from the LSUs 40, 50, 60 and 70 under the control of the CPU 91 of the measuring device 90. The CPU 91 controls the motor for driving the rotary polygon mirror, such that each rotary polygon mirror 42 of the laser scanning units 40, 50, 60 and 70 rotates at a predetermined speed, and controls the light source 41 such that a light signal corresponding to the data stored for evaluation is emitted. Under the control of the CPU 91, the light emitted from the LSUs 40, 50, 60 and 70 is incident on the light receiving surface of the CCDs 92, 93, 94 and 95. The CCD driver 96 controls the CCDs 92, 93, 94 and 95 to obtain the trace information of the light incident by the control of the CPU 91. The CCDs 92, 93, 94 and 95 are controlled by the CCD driver 96 to output an analog signal corresponding to the light spot incident to the ADC 99. The ADC 99 converts the analog signal into a digital signal, and outputs the digital signal to the CPU 91.

The CPU 91 obtains the trace information of the light emitted from the LSUs 40, 50, 60 and 70 to the CCDs 92, 93, 94 and 95, which are directly controlled by the CPU 91, from the digital signal input from the ADC 99. The CPU 91 calculates various data required for controlling scanning of the light and adjusting of the alignment of the LSUs 40, 50, 60 and 70 from the light trace information. This includes, for example, data indicating light spot size, data indicating intervals among the scanning lines on the surface onto which light is scanned by the LSUs 40, 50, 60 and 70, data indicating the intervals between spots, values of the total distance of the light trace formed on the image forming surface by respective LSUs 40, 50, 60 and 70, position data of the light spots formed on the image forming surface, which are emitted in synchronization with a pulse signal output from each of the LSUs 46, 56, 66 and 76, and then delayed for a predetermined time, and a deviation corresponding to the degree of diversified scanning upward and downward from the predetermined linear scanning direction formed on the image forming surface. The calculated data is used for making a determination as to whether or not to readjust the arrangement interval among the LSUs 40, 50, 60 and 70. Also, preferably, the calculated data is displayed in the output device 97, such as a monitor (not shown). The CPU 91 stores the scanning control data obtained from the LSU module 30 which has finished adjustment of arrangement intervals between the LSUs 40, 50, 60 and 70 via the above process in the memory device 80. The scanning control data stored in the memory device 80 may be information about the emission interval for a light beam from the light source, required for forming light spots on the image forming surface with a constant interval. Preferably, other than the data for controlling scanning, additional information such as a serial number, manufacturer, etc. is recorded in the memory device 80 via the input device 98.

The memory device 80 has a connector for connection with a device for reading the stored information.

The LSU module 30 is installed as follows. First, the LSU module 30 is fixed on a predetermined position within the printer main body. Then, the LSU module 30 is connected with an internal system controller placed within the main body of the printer.

Thus, because the system controller for controlling the general operation of the printer can obtain information required for controlling scanning of the light from the memory device 80, it is not necessary to perform a test printing process after assembly to calculate scanning synchronization data required for the scanning control.

On the other hand, in the case of the LSU module 30 having only one LSU, information of the scanning interval, required for scanning the light spots with constant intervals on the scanning surface, is stored in the memory device 80.

In the LSU module of the present invention, information for controlling the scanning synchronization of each LSU is provided from the memory device 80 such that misregistration of images is prevented after the LSU module is installed in the printer. Thus, a test printing process for controlling the scanning synchronization is not required.

What is claimed is:

1. A laser scanning unit module comprising:

one or more laser scanning units each having a rotary polygon mirror having a plurality of reflection surfaces, a light source for irradiating light toward said rotary polygon mirror, and a lens unit for focusing light reflected from said reflection surfaces of said rotary polygon mirror;

a base plate on which said one or more laser scanning units are installed; and a memory device for storing data required for scanning control of said one or more laser scanning units.

2. The laser scanning unit module of claim 1, wherein said memory device is non-volatile.

3. The laser scanning unit module of claim 2, wherein said memory device is one of an electrically erasable and programmable read only memory (EEPROM) and a flash memory.

4. The laser scanning unit module of claim 1, wherein said memory device is installed on said base plate.

5. A laser scanning unit module comprising:

a laser scanning unit having a rotary mirror, a light source for irradiating light toward said rotary mirror, and a lens unit for focusing light reflected from said rotary mirror;

a base plate on which said laser scanning unit is installed; and a memory device for storing data required for scanning control of said laser scanning unit;

wherein said data is obtained by simulating a print cycle.

6. The laser scanning unit module of claim 5, wherein said memory device is non-volatile.

7. The laser scanning unit module of claim 6, wherein said memory device is one of an electrically erasable and programmable read only memory (EEPROM) and a flash memory.

8. The laser scanning unit module of claim 5, wherein said memory device is installed on said base plate.

* * * * *